(12) United States Patent
Hafiz

(10) Patent No.: US 6,505,042 B1
(45) Date of Patent: Jan. 7, 2003

(54) SYSTEM AND METHOD FOR ESTABLISHING A COMMUNICATION LINK BETWEEN A MOBILE STATION AND A BASE STATION CONTROLLER

(75) Inventor: Sheikh A. Hafiz, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 0 days.

(21) Appl. No.: 09/332,257

(22) Filed: Jun. 10, 1999

(51) Int. Cl.[7] .................................................. H04Q 7/20
(52) U.S. Cl. ........................ 455/434; 455/552; 455/458
(58) Field of Search ................................ 455/426, 422, 455/424, 425, 434–437, 432, 458, 62, 552, 553

(56) References Cited

U.S. PATENT DOCUMENTS

| | | | | |
|---|---|---|---|---|
| 4,481,670 A | * | 11/1984 | Freeburg | 455/422 |
| 5,199,031 A | * | 3/1993 | Dahlin | 370/110.1 |
| 5,511,069 A | * | 4/1996 | England et al. | 370/24 |
| 6,073,021 A | * | 6/2000 | Kumar et al. | 455/422 |
| 6,064,886 A | * | 8/2000 | Forez et al. | 455/443 |
| 6,112,082 A | * | 8/2000 | Almgren et al. | 455/425 |
| 6,119,003 A | * | 9/2000 | Kukkohovi | 455/435 |
| 6,205,334 B1 | * | 3/2001 | Dent | 455/429 |
| 6,243,588 B1 | * | 6/2001 | Koorapaty et al. | 342/457 |

* cited by examiner

*Primary Examiner*—William Trost
*Assistant Examiner*—Congvan Tran
(74) *Attorney, Agent, or Firm*—Philip R. Wadsworth; Charles D. Brown; Bruce W. Greenhaus

(57) ABSTRACT

A system including a user station that prioritizes multiple cell sites (BTSs) based on the strength of a paging message being transmitted by the BTSs. The user station transmits a response message to one of the BTSs transmitting the paging message based upon selecting the access channel associated with the BTS from which the user station received the paging message having the strongest signal strength until a timeout period has expired, and subsequently transmits the response message on the access channel associated with the BTS from which the user station received the paging message having the next strongest signal strength. The user station includes a receiver to receive the paging message transmitted by multiple BTSs. The user station further includes a processor to analyze and prioritize the multiple BTSs into a sequence according to the signal strength of the paging message received. Coupled to the processor is a timer for timing the timeout period. The user station also includes a transmitter to transmit a response message on the access channels in response to receiving the paging message.

21 Claims, 4 Drawing Sheets

SYSTEM AND METHOD FOR ESTABLISHING A COMMUNICATION LINK BETWEEN A MOBILE STATION AND A BASE STATION CONTROLLER

FIELD OF THE INVENTION

The present invention relates to communication systems, and more particularly, to a system and method for establishing a communication link between a wireless telephone and a base station transceiver subsystem (BTS).

BACKGROUND OF THE INVENTION

Wireless communication devices, such as cellular telephones, rely on a network of cell sites located throughout a geographical-region to receive and transmit information. As shown in FIG. 1, a cellular telephone 10 is in communication with multiple cell sites 16 whenever the cellular telephone 10 is. powered on. Each cell site 16 includes a base station transceiver subsystem (BTS) 20 transmitting information to and receiving information from the cellular telephone 10 by using a cell site antenna 24. Multiple cell sites are strategically located throughout a geographical region so that cellular telephone coverage is consistent and continuous throughout the region. Groups of the cell sites 16 are connected to a base station controller (BSC) 30a, 30b by land lines 32 such that the cell sites 16 connected to the BSCs 30a, 30b will receive and transmit the same information. Although only two BSCs 30a, 30b are shown in FIG. 1, as many as 30 to 40 BSCs may be necessary to connect a sufficient number of the cell sites 16 together to provide adequate telephone coverage throughout a metropolitan region.

Upon powering up the cellular telephone 10, it transmits a number of operational parameters to one of the BSCs 30a, 30b to establish a communication link. The transmission from the cellular telephone 10 is received by one of the cell sites 16 in the vicinity, and the operational parameters are communicated via the associated BTS 20 to the BSCs 30a, 30b to which the particular cell site 16 and BTS 20 are connected. The BSCs 30a, 30b use the operational parameters to identify and register the cellular telephone 10 within its area of coverage. When the cellular telephone 10 is not currently being used to transmit or receive calls, the cellular telephone 10 remains in an idle state until there is a need to establish a communication link between the cellular telephone 10 and one of the BTSs 20.

The cellular telephone 10 and the cell sites 16 in the vicinity, use a frequency pair, known as a control channel 25 for signaling and exchanging operational parameters among them. Each cell site 16 contains a dedicated forward and reverse control channel. The reverse control channel is also called an access channel 27. Prior to receiving and transmitting information, as in a cellular call, a communication link between the cellular telephone 10 and one of the several cell sites 16 or BTSs 20 in the surrounding region must be established. Establishing such a communication link is facilitated by use of the control channel 25 and the access channel 27 on which the cellular phone 10 or the BTS 20 may exchange short messages. There is a paired control channel 25 and access channel 27 for each of the BTSs 20 within range of the cellular telephone 10. The information transmitted by the BTS 20 to the cellular phone 10 on the control channel 25 and by the cellular phone 10 to the BTS 20 on the access channel 27 provide the BTSs 20 with the necessary information to establish a communication link.

However, in the event the communication link fails to be established between the cellular telephone 10 and one of the BTSs 20, the incoming call will not be established, but will be aborted. Therefore, it can be appreciated that there is a need for a cellular telephone that increases the probability that a communication link will be established between the cellular phone and a BTS. The present invention provides this and other advantages, as will be apparent from the following detailed description and accompanying figures.

SUMMARY OF THE INVENTION

The present invention is embodied in a system and method directed to increase the likelihood that a communication link between a user station and a BTS is established, when an incoming message is to be received by the user station. In one embodiment, after receiving a paging message or incoming call, the system includes a user station that transmits a response message for a timeout period to a cell site or BTS, from which the user station received the paging message having the strongest signal strength, that is, to the primary BTS. In the event the primary BTS does not transmit an acknowledgment message to the user station before the timeout period expires, the user station then transmits the response message to that BTS from which the user station received the paging message having the second strongest signal strength on the respective control channel.

A BSC transmits the paging message to reach a cellular phone through sending simultaneous pages in multiple control channels (or paging channels) assigned to the BTSs. This invention will allow the cellular phone to establish communication with a second BTS, by using the control channel on which the paging message having the second strongest signal strength is received, when it fails the first time.

The user station includes a receiver to receive the paging message transmitted by multiple BTSs. The user station further includes a processor that analyzes and prioritizes the multiple BTSs into a sequence based upon the strength of the paging messages received. Coupled to the processor is a timer for timing the timeout period. The user station also includes a transmitter for transmitting the response message to one of the multiple BTSs in response to receiving the paging message.

In another embodiment of the present invention, the user station not only transmits the response message to the BTSs from which the user station receives the paging messages having the first and second strongest signals but will also transmit the response message to the BTS from which the user station receives the paging message having the next strongest signal when the timeout period has expired. The cellular telephone will continue transmitting the response message to each succeeding BTS in the sequence until the BTS to which the cellular telephone is currently transmitting responds with an acknowledgment message, or the number of BTSs to which the cellular phone may transmit is exhausted.

DETAILED DESCRIPTION OF THE PREFERRED EMBODIMENTS

Figure 1:
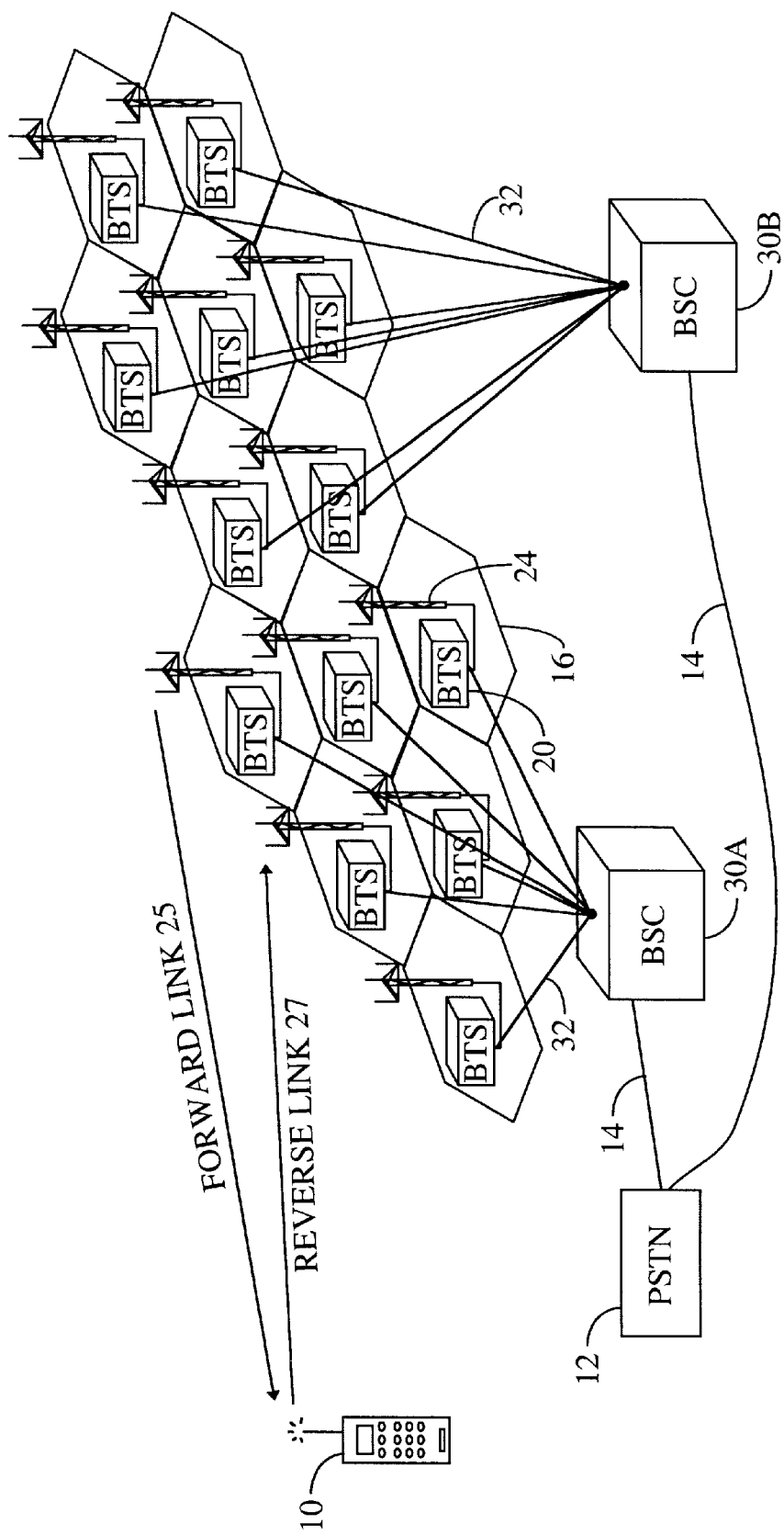
FIG. 1 illustrates the operation of a conventional cellular telephone with a network of cell sites and BSCs.

As previously discussed, before a cellular phone in the "idle" state can receive an incoming call, a communication link must be established between the cellular telephone and a BSC. To do this, all of the BTSs within a region transmit a paging message on their respective control channels to the cellular telephone indicating there is an incoming message. The cellular telephone receives the paging message from multiple BTSs and identifies the BTS from which it receives the paging message having the strongest signal, to which the cellular telephone transmits a response message on the corresponding access channel to acknowledge receipt of the paging message. Upon receiving the response message, the selected BTS transmits information used by the cellular phone to establish a communication link upon which the incoming message may be received. For example, the BTS transmits information on the control channel related to the frequency at which the communication link will be established. Once the communication link is established, two-way communication between the cellular phone and the selected BTS may occur in a conventional fashion.

However, the cellular telephone transmits the response message to the selected BTS for only a fixed period of time. In the event the selected BTS does not respond to the response message within the fixed period of time, the cellular telephone ceases its transmission of the response message and returns to an idle state. Consequently, a communication link is never established, and the incoming message is never transmitted to the cellular telephone, but is instead aborted.

The present invention overcomes these problems by prioritizing the multiple BTSs based on the signal strength of the paging message received by the cellular telephone. A response message is transmitted to more than only one control channels by transmitting the response message on the access channel associated with the primary BTS, that is, the BTS from which the cellular telephone received the strongest paging message, and later on to the secondary BTS, that is, the BTSs from which the cellular telephone received the second strongest paging message. For example, if the primary BTS does not respond within a timeout period, the cellular telephone of the present invention will cease transmitting to the primary BTS and begin transmitting the response message to the secondary BTS. Although described herein as transmitting the response signal to the BTS, from which the cellular telephone receives the paging messages having the two strongest signals, this is for illustrative purposes only, and should not be interpreted as limiting the scope of the present invention. The principles of the present invention are also applicable to a system where the cellular telephone transmits the response message to each succeeding BTS from which it receives the paging message having the next strongest signal strength until the BTS to which the cellular telephone is currently transmitting responds with an acknowledgment message on its respective control channel.

Figure 2:
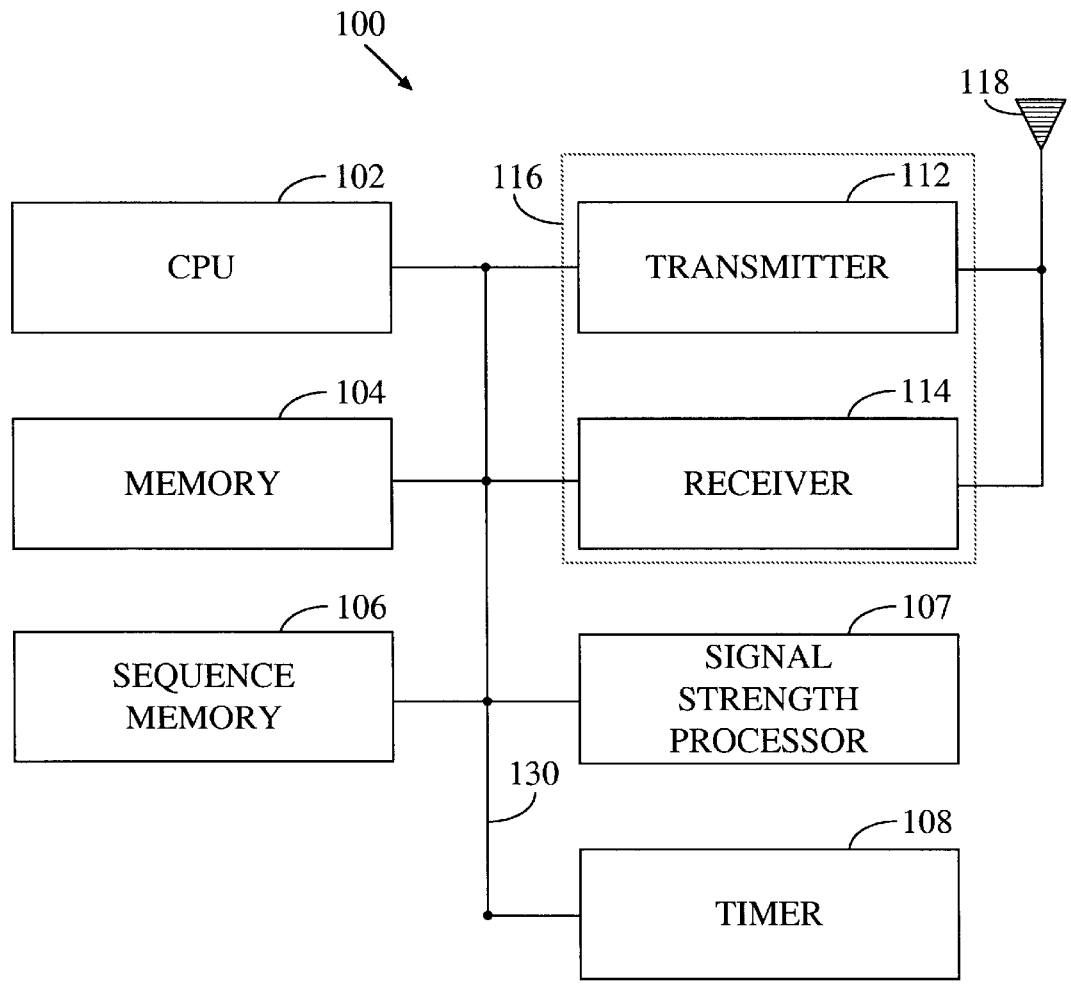
FIG. 2 is a functional block diagram of a mobile station of the present invention.

The present invention is embodied in a system 100 illustrated in the functional block diagram of FIG. 2. The system 100 may be represented by a variety of mobile stations. A common example is a wireless communication device, such as a cellular telephone. However, those skilled in the art will appreciate that the principles of the present invention are applicable to many forms of wireless communication, such as analog cellular, digital cellular, PCS, radio telephones, telephones using the advanced mobile phone service standard, and the like. The present invention is not limited by the specific form of wireless communication.

The system 100 includes a central processing unit (CPU) 102 that controls operation of the system. A memory 104, which may include both read-only memory (ROM) and random access memory (RAM), provides instructions and data to the CPU 102. A portion of the memory 104 may also include non-volatile random access memory.

The system 100 further includes a sequence memory 106 that is devoted to storing a sequence of BTSs based on the relative received signal strength of the paging message that is received from a respective BTS. Although FIG. 2 illustrates the sequence memory 106 as being distinct from the memory 104, it can be appreciated by one skilled in the art that the sequence memory 106 could also be a part of the memory 104.

Also included in the system 100 is a signal strength processor 107. The signal strength processor 107 measures the strength of the paging message as received over the control channel by using a conventional measuring technique that is well known in the art. For example, the signal strength processor 107 may determine the signal strength by using a received signal strength indicator (RSSI). Additionally, the signal strength processor may determine strength by measuring an absolute received signal power (dBm), by measuring an error rate of the message being received on the control channel, or by any other well known technique. The functional block diagram of FIG. 2 illustrates the signal strength processor 107 as a separate block because it performs a separate function. However, those skilled in the art will appreciate that the signal strength processor 107 may be implemented by the CPU 102 executing a series of instructions stored in the memory 104.

The system 100 also includes a timer 108, which may typically be included in the CPU 102. As will be discussed in greater detail below, the system 100 uses the timer 108 to measure the length of the timeout period.

The system 100 also includes a transmitter 112 and a receiver 114 to allow transmission and reception of data, such as the paging and response messages, between the system 100 and a remote location. An example of such a remote location is a BTS 20 (see FIG. 1). The transmitter 112 and receiver 114 may be combined into a transceiver 116. An antenna 118 is electrically coupled to the transceiver 116. The operation of the transmitter 112, receiver 114, and antenna 118 is well known in the art and will not be described herein.

The various components of the system 100 are coupled together by a bus system 130, which may include a power bus, control signal bus, and status signal bus in addition to the data bus. However, for the sake of clarity, the various buses are illustrated in FIG. 2 as the bus system 130.

The system 100 also includes many other components found in a conventional cellular telephone, but for the sake of clarity are omitted from FIG. 2. For example, those of ordinary skill in the art will recognize that the system 100 also includes several conventional components, such as a keypad, a display, a speaker, a microphone, and a battery.

Figure 3:
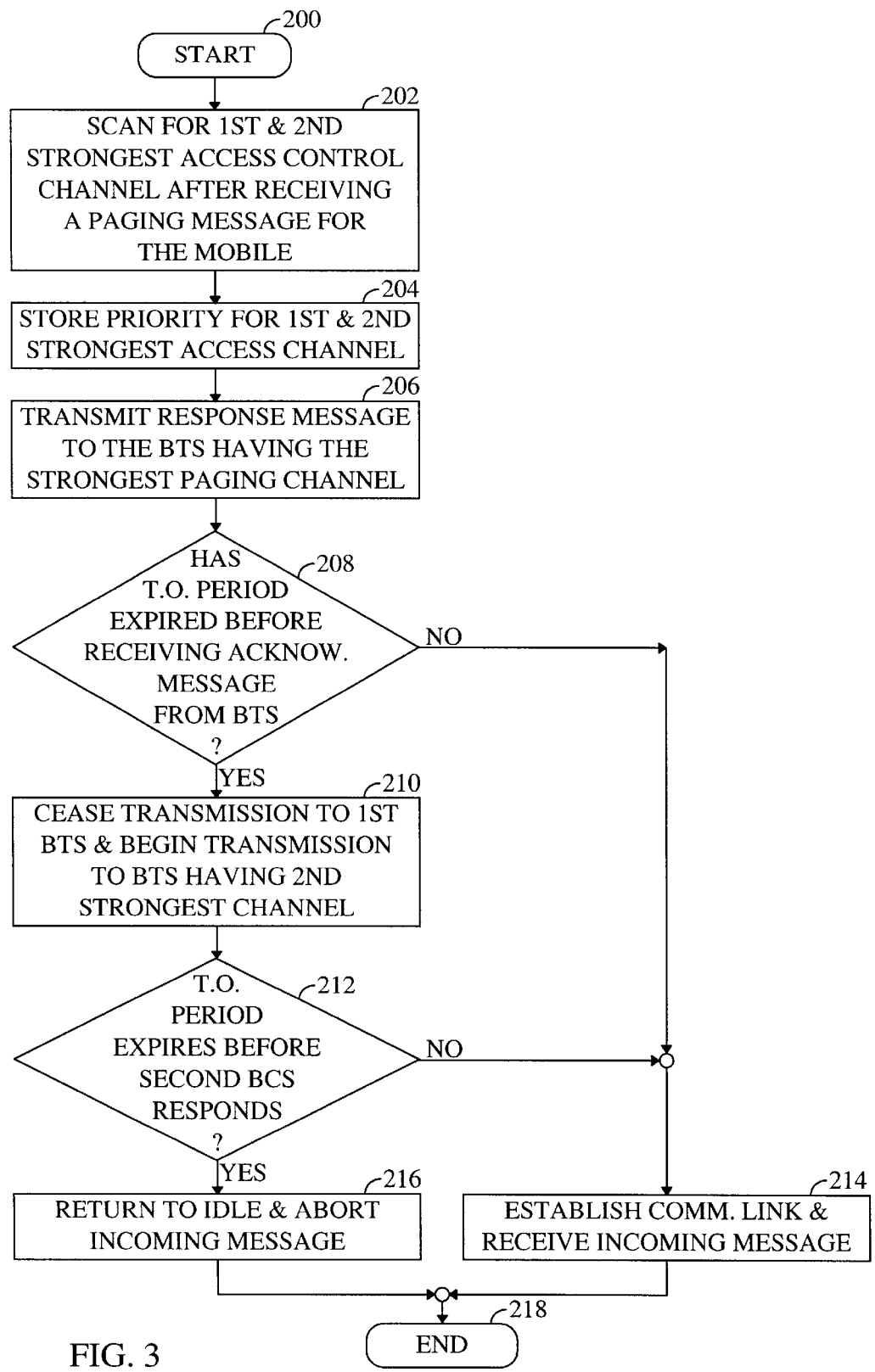
FIG. 3 is a flowchart of an operation of the mobile station of FIG. 2.
Figure 4:
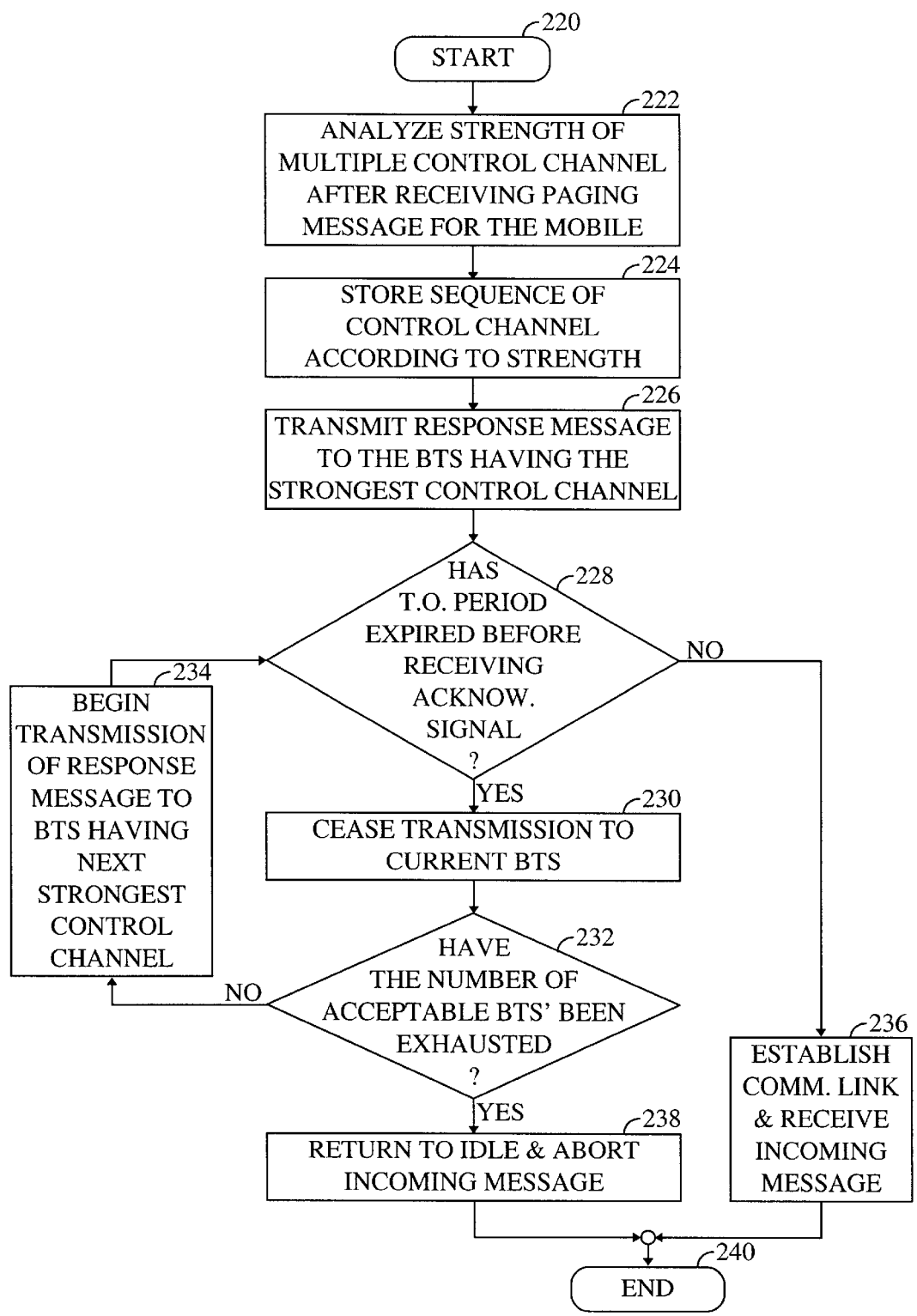
FIG. 4 is an flowchart of an alternative operation of the mobile station of FIG. 2.

The operation of the system 100 is described in further detail in the flowcharts of FIGS. 3 and 4. At a start 200, shown in FIG. 3, each of the BTSs within a geographic region transmits a paging message to the system 100 on a respective control channel, indicating that an incoming message has been directed to the system 100. In step 202, the receiver 114 (see FIG. 2) scans for the paging messages having the two strongest signals and the signal strength processor 107 prioritizes them based upon the relative signal strength of each paging message. As previously described, the relative strength of each paging message is measured by the signal strength processor 107 by using a conventional method such as an RSSI, measuring the dBm or error rate of the transmitted message, or by any other well-known technique. Thus, the sequence of BTSs has been prioritized based on the greatest signal strength of the paging message received by the system 100. In step 204, the system 100 may store the identity of the prioritized BTSs in the sequence memory 106 (see FIG. 2). Although storing the identity of the BTSs from which the system 100 receives the paging message having the two strongest signal strengths is not necessary, using the sequence memory 106 will facilitate determining the BTS to which the system 100 will transmit the response signal on the access channel associated with that BTS after the first timeout period has expired. This process avoids the necessity of recalculating the signal strength of the paging message received from all BTSs and selecting the BTS from which the system 100 receives the paging message having the second strongest signal strength.

After receiving the paging message, the system 100 must establish a communication link with a BTS before receiving the incoming message. In order to establish a communication link, in step 206 the system 100 uses the transmitter 112 (see FIG. 2) to transmit a response message on the access channel associated with the BTS from which the system 100 received the paging message having the strongest signal strength (referred to as the primary BTS). The timer 108 begins measuring the timeout period. An example of a typical value for the timeout period is approximately six seconds. In step 208, the system 100 awaits the receipt of an acknowledgment message from the primary selected in step 202.

If the system 100 receives an acknowledgment message from the primary BTS before the timeout period expires, the system proceeds to step 214 where a communication link is established between the primary, BTS and the system in a conventional manner. However, in the event that the system 100 does not receive the acknowledgment message from the primary BTS before the timeout period expires, the system 100 proceeds to step 210, ceases transmitting to the primary BTS, and subsequently begins transmitting the response message on the access channel associated with the BTS from which the system 100 received the paging message having the second strongest signal strength (referred to as the secondary BTS). The timer 108 is reset and begins measuring another timeout period. In step 212, if the secondary BTS responds to the system 100 with an acknowledgment message before the timeout period expires, the system 100 proceeds to step 214, and a communication link can be established upon which the incoming message can be received. As a result, the system 100 has received an incoming message that would have otherwise been aborted by a conventional cellular telephone after the first timeout period expired.

In the case where the secondary BTS does not respond to the system 100 before the second timeout period expires, the system 100 proceeds to step 216, where it returns to its idle state and the incoming message is aborted. The process of receiving an incoming message ends at step 218, and the cellular telephone remains in the idle state until the next paging message is received. As a person of ordinary skill in the art will appreciate, the first and second timeout periods may be of equal or unequal lengths of time.

Although operating the system 100 in the manner illustrated in FIG. 3 significantly increases the likelihood that an incoming message will be received, another embodiment of the system 100, having an operation as illustrated by the flowchart of FIG. 4, further increases the likelihood an incoming message will be received.

At a start 220, shown in FIG. 4, each of the BTSs within a BSC region transmits on its respective control channel a paging message to the system 100 to indicate that an incoming message has been received for the system 100. The receiver 114 (see FIG. 2) receives the paging message on several control channels, and in step 222, the signal strength processor 107 analyzes and prioritizes the BTSs according to the signal strength of the received paging messages. In step 224, the sequence memory 106 stores a sequence of control channels in order of the descending signal strength. As with step 204, illustrated in FIG. 3, storing the sequence in the sequence memory 106 is not necessary for operation, but will facilitate determining the BTS to which the system 100 will transmit the response signal when the timeout period has expired. In step 226, the system 100 transmits the response message on the access channel associated with the BTS from which the system 100 received the paging message having the strongest signal strength, as determined in step 222, and the timer 108 starts timing the first timeout period.

It is at this point that the operation illustrated by FIG. 4 differs from the operation illustrated by FIG. 3. In step 228, if the timeout period expires, the system 100 proceeds to step 230 and will cease transmission of the response message to the current BTS. In step 232, the system 100 will determine if there are any remaining control channels in the sequence stored in step 224 upon which to transmit the response message. If the number of control channels has not been exhausted, the system 100 proceeds to step 234, and begins transmitting the response message on the access channel associated with the BTS from which the system 100 received the paging message having the next strongest signal strength. The system 100 now returns to step 228, where the timer 108 (see FIG. 2) begins timing another timeout period.

As illustrated in FIG. 4, steps 228–234 will continue until one of two situations occurs. In the first situation, the BTS to which the system 100 is currently transmitting the response message responds by transmitting an acknowledgment message on its control channel. The cellular telephone then proceeds to step 236 from step 228, and a communication link is established upon which the incoming message can be received. In the second situation, the sequence of BTSs from which the cellular phone received the paging message is exhausted. If this determination is made in step 232, the system 100 proceeds to step 238 and returns to an idle state. Consequently, the incoming message is aborted, and the cellular telephone remains in the idle state until the next paging message is received.

Repeating the transmission of the response message to a BTS from which the system 100 received the paging message having the next strongest signal strength significantly increases the likelihood that one of the BTSs in the BSC region will transmit an acknowledgment message, and the incoming message will be received by the system 100.

It is to be understood that even though various embodiments and advantages of the present invention have been set forth in the foregoing description, the above disclosure is illustrative only, and changes may be made in detail, yet remain within the broad principles of the invention. For example, the preceding descriptions described the system 100 as either sequencing through two BTSs from which the system 100 receives the paging messages having the two strongest signal strengths, that is, through the primary and secondary BTSs, or through an entire sequence of BTSs prioritized by the processor 107 according to signal strength of the paging message received. However, those of ordinary skill in the art will appreciate that the system 100 can be operated to sequence through any number of BTSs before returning to an idle state. For example, the sequence can include the three BTSs from which the signal strength processor 107 determines to be the three strongest paging messages, that is, the primary, secondary, and tertiary BTSs. Furthermore, the present invention is described with respect to mobile stations, but can be satisfactorily used with a fixed location wireless communication device. Therefore, the present invention is to be limited only by the appended claims.

What is claimed is:

1. A communication system including a plurality of base station transceiver subsystems for transmitting a paging message indicative of an incoming message, the communication system comprising:

a first of the plurality of base station transceiver subsystems transmitting the paging message;

a second of the plurality of base station transceiver subsystems transmitting the paging message; and a user station operatively coupled to receive the paging message from the first and second base station transceiver subsystems and selecting therefrom a primary base station transceiver subsystem and a secondary base station transceiver subsystem according to a relative strength of the respective paging messages received, the user station transmitting a response signal to the primary base station transceiver subsystem for a predetermined period of time and then to the secondary base station transceiver subsystem if the predetermined period of time expires without receiving an acknowledgment message from the primary base station transceiver subsystem.

2. The communication system of claim 1, further including a third of the plurality of base station transceiver subsystems transmitting the paging message, and wherein the user station selects from the first, second, and third base station transceiver subsystems a primary, secondary, and tertiary base station transceiver subsystem according to a relative strength of the respective paging messages received, the user station transmitting the response signal to the secondary base station transceiver subsystem for the predetermined period of time and then to the tertiary base station transceiver subsystem if the predetermined period of time has expired without receiving an acknowledgment message.

3. The communication system of claim 1 wherein the first and second of the plurality of base station transceiver subsystems and the user station are adapted to receive and transmit using an advanced mobile phone service standard.

4. The communication system of claim 1 wherein the user station comprises:

a receiver to receive the paging message from the first and the second of the plurality of base station transceiver subsystems;

a processor coupled to the receiver to select from between the first and the second of the plurality of base station transceiver subsystems a primary and secondary base station based on a relative strength of the paging message received from each base station transceiver subsystem;

a timer coupled to the processor to time the predetermined period of time; and a transmitter coupled to the processor to transmit the response signal to the primary base station transceiver subsystem for the predetermined period of time and then to the secondary base station transceiver subsystem if the predetermined period of time expires without receiving an acknowledgement message.

5. The communication system of claim 4, further including a memory coupled to the processor to store an identity of the primary and secondary base station transceiver subsystems.

6. The communication system of claim 4 wherein the processor is adapted to measure the relative strength of the paging message using a received signal strength indicator.

7. A user station operatively coupled to a plurality of base station transceiver subsystems to receive from and transmit to the plurality of base station transceiver subsystems, the user station comprising:

a receiver to receive a message transmitted by each of the plurality of base station transceiver subsystems indicative of an incoming message intended for the user station and to measure a relative strength thereof;

a processor coupled to the receiver to prioritize the plurality of base station transceiver subsystems according to descending relative strength of the message received from each of the plurality of base station transceiver subsystems;

a timer coupled to the receiver to time a timeout period; and a transmitter to transmit a response message to a first of the plurality of base station transceiver subsystems having the highest priority for a first timeout period and then to a second of the plurality of base station transceiver subsystems having the second highest priority for a second timeout period after the first timeout period expires without receiving an acknowledgment message.

8. The user station of claim 7, further including a memory coupled to the processor to store an identity of the first and second of the plurality of base station transceiver subsystems.

9. The user station of claim 7 wherein the receiver and transmitter are adapted to receive and transmit using an advanced mobile phone service standard.

10. The user station of claim 7 wherein the processor is adapted to measure the relative strength of the signal received from each base station transceiver subsystem using a received signal strength indicator.

11. The user station of claim 7 wherein the transmitter is adapted to transmit the response message to a third of the plurality of base station transceiver subsystems having the third highest priority for a third timeout period if the second timeout period expires without receiving an acknowledgment message.

12. The user station of claim 11 wherein the transmitter is adapted to transmit the response message for a default timeout period to succeeding ones of the plurality of base stations having the next highest priority until the receiver receives an acknowledgment message from the base station to which the transmitter is currently transmitting.

13. The user station of claim 11 wherein the first, second, and third timeout periods are unequal.

14. A method for a user station operatively coupled to a plurality of base station transceiver subsystems to respond to a message indicative of an incoming message transmitted by the plurality of base station transceiver subsystems on a corresponding plurality of access channels, the method comprising:

scanning for the message transmitted on a first and second control channel according to the strongest and second strongest relative strengths of the signals received on each of the corresponding plurality of control channels;

transmitting for a first timeout period a response message on the first control channel; and transmitting for a second timeout period the response message on the second control channel if the first timeout period has expired without receiving an acknowledgment message.

15. The method of claim 14, further comprising storing an identity of the first and second control channels in a memory.

16. The method of claim 14 wherein transmitting the response signal in the first and second control channels comprises using an advanced mobile phone service standard.

17. The method of claim 14, further comprising:

scanning for the message in a third control channel according to the third strongest relative strength of the signal received in the remaining plurality of control channels; and transmitting the response message in the third control channel if the second timeout period has expired without receiving an acknowledgment message.

18. A method for a user station to respond to a message indicative of an incoming message transmitted by a plurality of base station transceiver subsystems, the method comprising:

analyzing the message received from each of the plurality of base station transceiver subsystems for a received signal strength;

sequencing the plurality of base station transceiver subsystems into a sequence according to their corresponding descending received signal strengths;

transmitting a response message for a predetermined period of time to a first base station transceiver subsystem in the sequence of base station transceiver subsystems;

transmitting the response message for the predetermined period of time to each succeeding base station transceiver subsystem in the sequence of base station transceiver subsystems if the predetermined period of time expires without receiving an acknowledgment signal.

19. The method of claim 18, further comprising storing the sequence of base station transceiver subsystems in a memory.

20. The method of claim 18 wherein analyzing the received signal strength of the message transmitted by each of the plurality of base station transceiver subsystems comprises using a received signal strength indicator.

21. The method of claim 18 wherein transmitting the response message comprises using an advanced mobile phone service standard.

* * * * *